United States Patent [19]

Murayama et al.

[11] Patent Number: 4,471,362

[45] Date of Patent: Sep. 11, 1984

[54] RECORDING APPARATUS

[75] Inventors: Tomio Murayama; Takashi Ohmori, both of Kanagawa, Japan

[73] Assignee: Fuji Xerox Co., Ltd., Tokyo, Japan

[21] Appl. No.: 574,642

[22] Filed: Jan. 30, 1984

Related U.S. Application Data

[63] Continuation of Ser. No. 341,368, Jan. 21, 1982, abandoned.

[30] Foreign Application Priority Data

Jan. 23, 1981 [JP] Japan ................................. 56-7986

[51] Int. Cl.³ ............................................ G01D 15/10
[52] U.S. Cl. ................................. 346/76 PH; 400/120
[58] Field of Search .................... 346/76 PH, 76 R; 400/120; 250/316.1, 318; 219/216

[56] References Cited

U.S. PATENT DOCUMENTS 4,067,017 1/1978 Dertouzos ................. 346/76 PH X
4,365,254 12/1982 Ozawa ....................... 346/76 PH X Primary Examiner—Joseph W. Hartary
Attorney, Agent, or Firm—Sughrue, Mion, Zinn, Macpeak and Seas

[57] ABSTRACT

In a multi-station recording apparatus, the ink donor sheets extend along the paper path substantially to the next recording station while in contact with the recording paper to maintain proper paper registration.

9 Claims, 4 Drawing Figures

RECORDING APPARATUS

BACKGROUND OF THE INVENTION

This application is a continuation, of application Ser. No. 341,368 now abandoned, filed Jan. 21, 1982.

This invention relates to an apparatus for recording information on recording paper by employing a plurality of ink donor films, and more particularly, to such a recording apparatus which can prevent improper positioning of the recording paper relative to each thermal recording head.

There are known heat transfer recording apparatus in which a hot-melt solid ink applied to one surface of the base of an ink donor film is melted in accordance with pictorial information and transferred onto recording paper for recording the information thereon. A heat transfer multicolor recording apparatus comprises a plurality of differently colored ink donor films and a corresponding number of thermal recording heads which are spaced apart from one another in the direction of travel of the recording paper. Multicolor recording is achieved on a single sheet of recording paper if each thermal recording head accomplishes recording in a predetermined position on the recording paper at a precise timing.

FIG. 1 shows a conventional recording apparatus employing a plurality of ink donor films. Recording paper 2 is transported in the direction of an arrow 1 along a plurality of guide plates 3 to 8, and discharged in the direction of an arrow 9. A plurality of thermal recording heads 11 and 12 are provided in the path along which the recording paper 2 is transported. Ink donor films 17 and 18, which are delivered from supply rolls 13 and 14, and wound on take-up rolls 15 and 16, are in sliding contact with the thermal recording heads 11 and 12, respectively. The arrows indicate the directions of roll rotation, and film travel. The ink donor films 17 and 18 are coated with hot-melt solid inks of different colors, e.g. black and red. The recording paper 2 is pressed into contact with the ink donor films on the thermal recording heads 11 and 12 by back rolls 19 and 21 rotating in the direction of the arrows as the paper passes through the apparatus, whereby the inks are melted in accordance with pictorial information and are transferred onto the paper 2.

After transfer, the ink still remains weakly adherent to the base of the ink donor film 17 in the first recording station. Therefore, the recording paper 2 maintains its intimate contact with the ink donor film 17. However, the leading edge of the recording paper 2 usually does not carry any image transferred thereon, but has a portion which does not receive any transferred ink from the ink donor film 17 and therefore does not adhere closely to the film 17. Accordingly, this portion of the paper projects outwardly when the direction of the film 17 changes downwardly, and is caught by the adjacent edge of the guide plate 6, so that the remaining portion of the paper 2 may be progressively separated from the ink donor film 17. Likewise, the recording paper 2 on which information has been transferred is separated from the ink donor film 18 by the guide plate 8 in the second recording station 23.

The separation of the paper from the ink donor film is, however, not always carried out reliably, since it relies on the separation of the aforesaid portion not contacting with melted ink on the film. If the leading edge of the recording paper 2 fails to be separated completely, the recording paper 2 is likely to be carried over toward the take-up roll 15 or 16.

Further, the recording paper 2 is transported into the second recording station 23 by the rotation of the back roll 19 in the first recording station 22. Although this arrangement simplifies the mechanism for paper transportation, the recording paper 2 is likely to skew or be fed obliquely during its travel. There is, thus, every likelihood that information may be recorded in the wrong position on the recording paper 2 in the second recording station 23 so that the two image colors will be out of registration with respect to one another.

SUMMARY OF THE INVENTION

It is an object of this invention to provide a recording apparatus which overcomes the aforesaid drawbacks by causing transportation of recording paper to the second recording station, or any further recording station following it to be carried out by the ink donor film in the immediately preceding recording station.

In the preferred embodiment the ink donor sheet in each station except the last station extends along the paper travel path in contact with the recording paper, and the recording paper is not separated from the donor sheet until immediately prior to the next station. The donor sheet then makes a turn away from the paper path at an angle greater than 90°, whereby the relatively stiff paper will break away and be picked up by the next donor sheet.

BRIEF DESCRIPTION OF THE DRAWINGS

The invention will now be described in detail with reference to a preferred embodiment thereof as shown in the drawings, in which like numerals are used to designate like parts throughout the views. In the drawings.

DETAILED DESCRIPTION OF THE INVENTION

Figure 1:
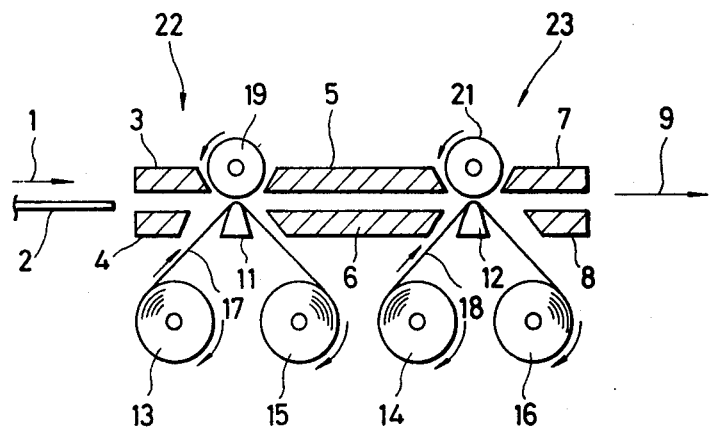
FIG. 1 is a side elevational veiw showing a conventional recording apparatus by way of example.
Figure 2:
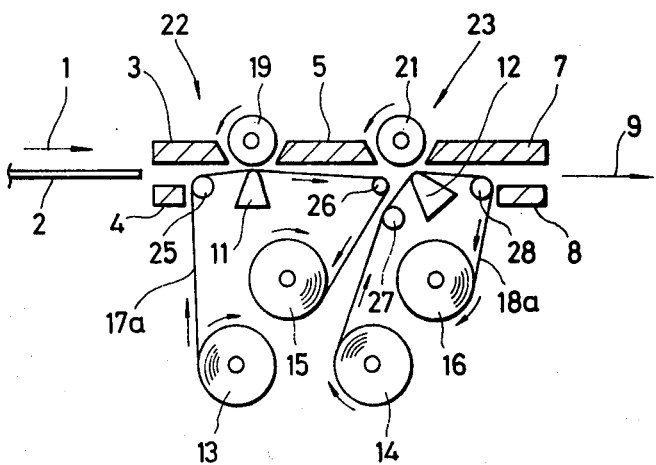
FIG. 2 is a side elevational view of the recording apparatus embodying this invention.
Figure 3:
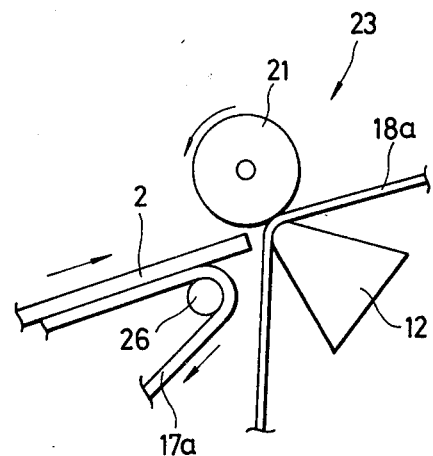
FIG. 3 is an enlarged view in side elevation of the portion of the apparatus in which the recording paper is separated from the ink donor film.

Referring first to FIG. 2, an ink donor film 17a withdrawn from the supply roll 13 in the first recording station 22 travels past a guide roll 25, a thermal recording head 11 and another guide roll 26, and is then wound on the take-up roll 15. Likewise, an ink donor film 18a in the second recording station 23 travels past a pair of guide rolls 27 and 28 positioned on the opposite sides of a thermal recording head 12, and is wound on the take-up roll 16. The guide roll 26 is positioned in the vicinity of the second recording station 23 as shown in FIGS. 2 and 3. The transportation of the recording paper 2 from the first thermal recording head 11 to the second thermal recording head 12 is carried out by the ink donor film 17a from which information has already been transferred onto the paper. This transportation is performed reliably, since the molten ink maintains the recording paper 2 in intimate contact with the film 17a, as hereinabove described.

Figure 4:
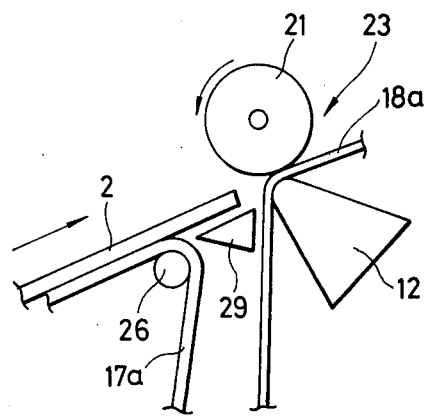
FIG. 4 is a side elevational view showing a modified form of the arrangement for paper separation shown in FIG. 3.

The ink donor film 17a is folded back at an acute angle around the guide roll 26, as shown in FIG. 3. The recording paper 2, however, so stiff that it is not folded back, irrespective of whether its leading edge has a portion which does not intimately contact the film 17a (or which does not carry any image recorded thereon). It moves forward, and is caught by the back roll 21, whereby the paper 2 is probably separated from the ink donor film 17a. In order to further ensure the separation of the paper from the film, it may be useful to provide a guide member 29 in the vicinity of the guide roll 26 as shown in FIG. 4.

According to this invention, the transportation of recording paper to a region immediately in front of each thermal recording head in the second recording station or any further recording station following it is carried out by the ink donor film in the immediately preceding recording station with which the ink thereon maintains the paper in intimate contact, as hereinabove described. This feature of the invention permits prevention of any skew on the recording paper during its transportation, and of any resulting displacement of the image transferred onto the paper. Although the embodiment as hereinabove described is directed to a two-color recording apparatus having two recording stations, this invention is also applicable to a multicolor recording apparatus including a further recording station or stations and no positional deviation of the recording paper 2 will be caused before the final recording station if an additional ink donor film or films are provided.

What is claimed is:

1. A recording apparatus comprising; a first recording station with a first thermal head, a first moving ink donor sheet, a recording paper passing in a paper travelling direction while in contact with said donor sheet for recording image information onto said paper, and at least a second recording station downstream of said first recording station in said paper travelling direction having a second thermal head and a back roller, means positioned immediately upstream of said second thermal head and underneath said back roller for separating said first ink donor sheet from said recording paper, wherein said first moving ink donor sheet carries said recording paper in contact therewith to a point immediately before said second recording station to maintain contact and registration between said first ink donor sheet and said recording paper.

2. A recording apparatus as claimed in claim 1, wherein said paper travels to said second recording station along a paper path, and said first moving ink donor sheet extends along said path.

3. A recording apparatus as claimed in claim 1, wherein said second recording station includes a second moving ink donor sheet and second thermal head, said first moving ink donor sheet turning away from said paper path in the vicinity of said second recording station whereby said recording paper contacts and advances with said second donor sheet.

4. A recording apparatus as claimed in claim 3, wherein said first ink donor sheet turns away from said paper path at an angle sharper than 90°.

5. A recording apparatus as claimed in claim 1, wherein said means positioned in the vicinity of said second recording station further comprises guide means adjacent said turning point of said first ink donor sheet for guiding said recording paper from said first ink donor sheet to said second ink donor sheet.

6. A recording apparatus as claimed in any one of claims 3-5, wherein said first and second ink donor sheets are separated along said paper path by an amount substantially less than the separation along said paper path between said first and second thermal heads.

7. A recording apparatus as claimed in claim 1, wherein said at least second recording station includes a plurality of recording stations one of which is a last recording station, with each of said plurality of recording stations except said last station including a respective moving ink donor sheet which extends a substantial distance past its respective thermal head in contact with said recording paper.

8. A recording apparatus of claim 1 wherein said second recording station includes a back roller, and said means positioned in the vicinity of said second recording station comprises a guide roll adjacent said back roll to define a turning point of said first ink donor sheet to separate it from said recording paper.

9. A recording apparatus comprising; a first recording station with a first thermal head, a first moving ink donor sheet, a recording paper passing in a paper travelling direction while in contact with said donor sheet for recording image information onto said paper, and at least a second recording station downstream of said first recording station in said paper travelling direction having a second thermal head, a second ink donor sheet and a back roller, means positioned in the vicinity of said second thermal head and adjacent said back roller for separating said first ink donor sheet from said recording paper, and a guide block positioned between said means for separating said first ink donor sheet from said recording paper and said second thermal recording head for guiding said recording paper from said first ink donor sheet to said second ink donor sheet, wherein said first moving ink donor sheet carries said recording paper in contact therewith to a point immediately before said second recording station to maintain contact and registration between said first ink donor sheet and said recording paper.

* * * * *